(12) United States Patent
Alfano (10) Patent No.: US 7,590,721 B2
(45) Date of Patent: Sep. 15, 2009

(54) REORDERING SEQUENCE BASED CHANNELS

(75) Inventor: Vic Alfano, Santa Monica, CA (US)

(73) Assignee: Topside Research, LLC, Williamsburg, VA (US)

( * ) Notice: Subject to any disclaimer, the term of this patent is extended or adjusted under 35 U.S.C. 154(b) by 187 days.

(21) Appl. No.: 11/759,194

(22) Filed: Jun. 6, 2007

(65) Prior Publication Data

US 2007/0237151 A1    Oct. 11, 2007

Related U.S. Application Data

(63) Continuation of application No. 10/295,399, filed on Nov. 14, 2002, now abandoned.

(51) Int. Cl.
*G06F 15/173* (2006.01)
(52) U.S. Cl. .................. 709/223; 709/238; 709/224; 370/392; 370/394; 370/400
(58) Field of Classification Search .......... 709/238, 709/232, 223, 224; 370/389, 392, 394, 400, 370/401
See application file for complete search history.

(56) References Cited

U.S. PATENT DOCUMENTS

| | | | |
|---|---|---|---|
| 4,330,824 A | 5/1982 | Girard | |
| 4,394,725 A | 7/1983 | Bienvenu et al. | |
| 4,740,954 A | 4/1988 | Cotton et al. | |
| 4,754,451 A | 6/1988 | Eng et al. | |
| 5,550,823 A | 8/1996 | Irie et al. | |
| 5,555,543 A | 9/1996 | Grohoski | |
| 5,606,370 A | 2/1997 | Moon | |
| 5,845,145 A | 12/1998 | James | |
| 5,860,085 A | 1/1999 | Stormon et al. | |
| 5,898,689 A | 4/1999 | Kumar et al. | |
| 5,905,911 A | 5/1999 | Shimizu | |
| 5,909,440 A | 6/1999 | Ferguson et al. | |
| 5,923,893 A | 7/1999 | Moyer et al. | |
| 5,982,749 A | 11/1999 | Daniel et al. | |

(Continued)

OTHER PUBLICATIONS

Petaswitch Solutions, Inc., The Pisces Chipset, Product Brief, 2001, http://www.peta-switch.com/products/product_brief.htm.

(Continued)

*Primary Examiner*—Lashonda T Jacobs
(74) *Attorney, Agent, or Firm*—SoCal IP Law Group LLP; Steven C. Sereboff; John E. Gunther (57) ABSTRACT

System for reordering packet segments in a switching network. A system is provided for reordering packet segments in a packet switch network, wherein a plurality of source processors transmit the packet segments to a destination processor via one or more network fabrics. The system comprises encoder logic at each source processor that operates to associate a unique segment identifier with each of the packet segments before they are transmitted. A memory and map logic located at the destination processor operate to receive the packet segments, map the segment identifier associated with each of the packet segments to a memory region in the memory, and store each received packet at its respective memory region. A Dequeue processor coupled to the memory operates to determine when enough packet segments are stored in the memory to form a complete data frame and outputs that frame.

17 Claims, 8 Drawing Sheets

U.S. PATENT DOCUMENTS

| | | | |
|---|---|---|---|
| 6,026,092 | A | 2/2000 | Abu-Amara et al. |
| 6,067,408 | A | 5/2000 | Runaldue et al. |
| 6,172,927 | B1 | 1/2001 | Taylor |
| 6,192,465 | B1 | 2/2001 | Roberts |
| 6,246,684 | B1 * | 6/2001 | Chapman et al. ............ 370/394 |
| 6,389,489 | B1 | 5/2002 | Stone |
| 6,434,115 | B1 | 8/2002 | Schwartz |
| 6,442,674 | B1 | 8/2002 | Lee et al. |
| 6,460,120 | B1 | 10/2002 | Bass et al. |
| 6,493,347 | B2 | 12/2002 | Sindhu et al. |
| 6,570,876 | B1 | 5/2003 | Aimoto |
| 6,574,194 | B1 | 6/2003 | Sun et al. |
| 6,629,147 | B1 * | 9/2003 | Grow ........................ 709/236 |
| 6,687,768 | B2 | 2/2004 | Horikomi |
| 6,735,647 | B2 | 5/2004 | Boyd |
| 6,754,741 | B2 | 6/2004 | Alexander et al. |
| 6,781,992 | B1 * | 8/2004 | Rana et al. ................. 370/394 |
| 6,795,870 | B1 | 9/2004 | Bass et al. |
| 6,842,443 | B2 | 1/2005 | Allen, Jr. et al. |
| 6,907,041 | B1 | 6/2005 | Turner |
| 6,934,760 | B1 * | 8/2005 | Westbrook et al. .......... 709/231 |
| 6,967,951 | B2 * | 11/2005 | Alfano ....................... 370/394 |
| 6,977,941 | B2 | 12/2005 | Takahashi et al. |
| 6,987,760 | B2 | 1/2006 | Calvignac et al. |
| 7,096,305 | B2 | 8/2006 | Moll |
| 7,349,393 | B2 * | 3/2008 | Pierson ....................... 370/392 |
| 7,403,525 | B2 * | 7/2008 | Sano et al. .................. 370/392 |
| 7,480,308 | B1 * | 1/2009 | Cohen et al. ................ 370/412 |
| 7,529,245 | B1 * | 5/2009 | Muller et al. ............... 370/394 |
| 2001/0037435 | A1 | 11/2001 | Van Doren |
| 2002/0165947 | A1 | 11/2002 | Akerman et al. |
| 2003/0035427 | A1 | 2/2003 | Alasti et al. |

OTHER PUBLICATIONS

Petaswitch Solutions, Inc., PetaSwitch Solutions Announces Raising $4 Million in First Round Financing, Press Release, 2001, http://peta-switch.com/newsroom/press_releases.htm.

Petaswitch Solutions, Inc., Company Overview, 2001, http://www.peta-switch.com/markets/overview.htm.

Gupta, Scheduling in Input Queued Switches: A Survey, Jun. 1996, Department of Computer Science, Stanford University, California.

Schoenen, et al., Distributed Cell Scheduling Algorithms for Virtual-Output-Queued Switches, Dec. 1999, pp. 1211-1215, vol. 1, Globecom, IEEE Global Telecommunications Conference.

Fahmy, A Survey of ATM Switching Techniques, Aug. 14, 2001, Department of Computer and Information Science, The Ohio State University.

Stiliadis, et al., Rate-Proportional Servers: A Design Methodology for Fair Queueing Algorithms, Dec. 1995, Computer Engineering & Information Sciences, University of California, Santa Cruz.

Stoica, et al., Earliest Eligible Virtual Deadline First: A Flexible and Accurate Mechanism for Proportional Share Resource Allocation, Department of Computer Science, Old Dominion University, Norfolk, VA.

* cited by examiner

REORDERING SEQUENCE BASED CHANNELS

RELATED APPLICATION INFORMATION

This patent is a continuation of application Ser. No. 10/295,399 filed Nov. 14, 2002.

FIELD OF THE INVENTION

The present invention is related generally to the operation of switching networks, and more particularly, to a system for reordering sequence based packet segments in a switching network.

BACKGROUND OF THE INVENTION

Communications networks now require the handling of data at very high data rates. For example, 10 gigabits per second (Gbps) is common. When it is required to process data at these speeds, multiple high-speed parallel connections may be used to increase the effective bandwidth. However, this may result in one or more transmission problems, since the data streams must be divided to be distributed over the multiple parallel connections, and at some point after parallel transmission, recombined to form the original streams.

Figure 1:
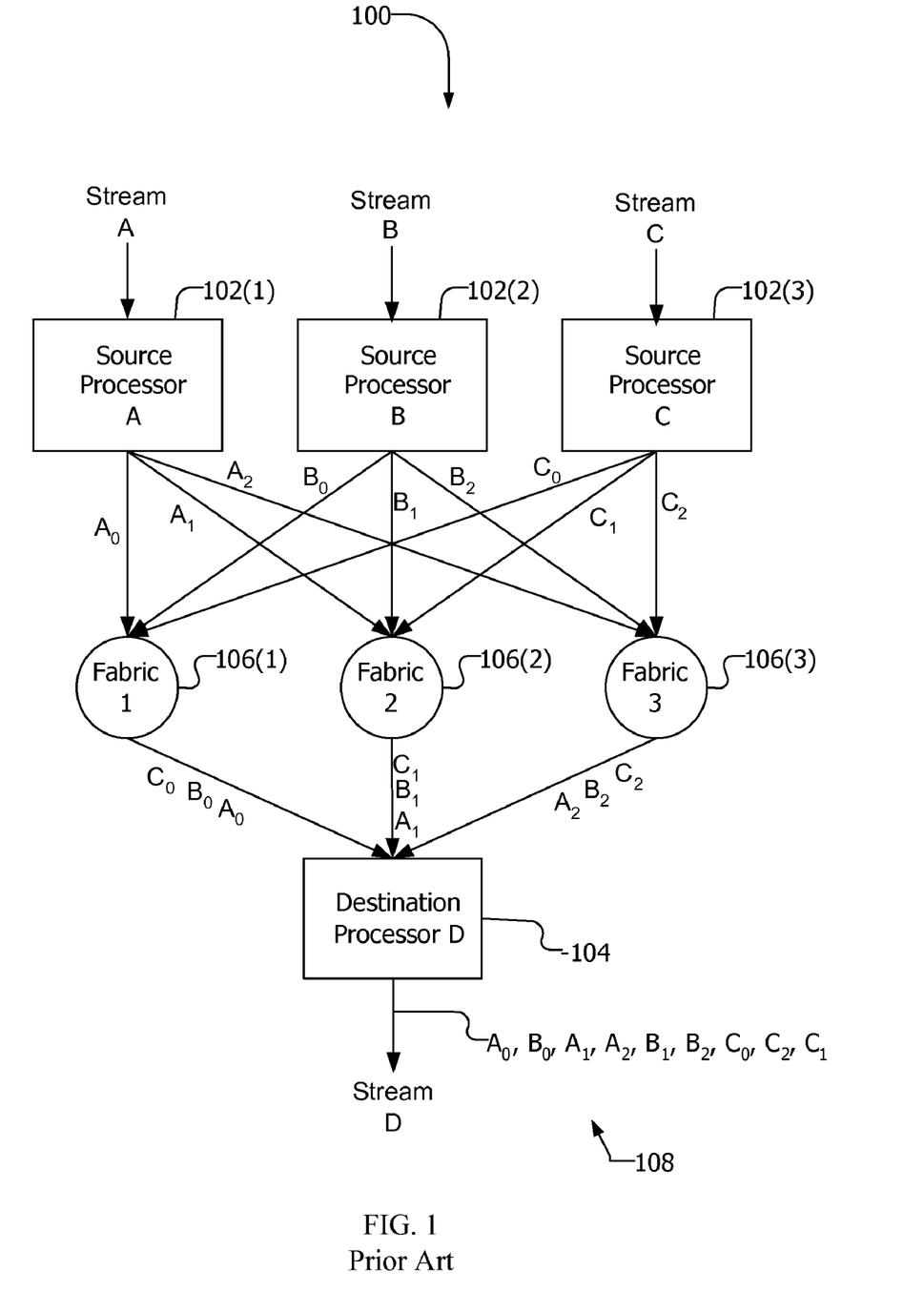
FIG. 1 shows a block diagram of a typical network structure for transmitting data frames from source processors to destination processors.

FIG. 1 shows a block diagram 100 of a typical network structure for transmitting data frames (or data packets) from source processors 102 to a destination processor 104 via network fabrics 106. The data streams include frames that may comprise a fixed amount of data. For example, stream A may include frames A0, A1, and A2 that are received by the source processor A and transmitted to each of the fabrics as shown. The stream B may include frames B0, B1 and B2 that are transmitted to the fabrics by source processor B as shown, and the stream C may include frames C0, C1 and C2 that are transmitted to the fabrics by source processor C as shown.

Once the frames are received by the fabrics, they are transmitted to the destination processor 104. The destination processor receives the frames in the order they arrive and combines them for transmission to another network entity, as shown by stream D.

A significant problem that exists with current transmission systems, such as the system shown in FIG. 1, is that the frames may end up in the wrong order when transmitted from the destination processor D. For example, the frames may be output in the order shown at 108. In this case, frame B2 is output before frame B1, and frame C2 is output before frame C1. Thus, the frames received from source processors B and C are transmitted from the destination processor 104 out of order. In such a case, it may be necessary to discard the out of order frames of data and request a new transmission of those frames. As a result, additional overhead will be used and a corresponding loss of transmission bandwidth will be realized.

Additional problems can occur in systems where the transmitted data frames have been segmented before transmission. In these systems, it is possible that both the frames and/or individual segments of each frame are transmitted out of order. Thus, even if the frames maintain the correct order with respect to a transmitting source processor, segments within the frames may be out of order.

Therefore, it would be desirable to have a way to reorder frames of data in a transmission system so that the frames are output in the correct order, thereby improving transmission efficiency. Furthermore, it would also be desirable to have a way to reorder frame segments so that both the frames and their corresponding segments are output in the correct order.

SUMMARY OF INVENTION

The present invention includes a system for reordering sequence based packet segments in a switching network. For example, in one embodiment of the invention, a reordering system is provided that receives packet segments from multiple sources and reorders the received packet segments based on sequence information associated with each segment so that both the segments, and frames constructed from the segments, are output from a destination processor in the correct order.

In one embodiment included in the present invention, a system is provided for reordering packet segments in a packet switch network, wherein a plurality of source processors transmit the packet segments to a destination processor via one or more network fabrics. The system comprises encoder logic at each source processor that operates to associate a unique segment identifier with each of the packet segments before they are transmitted. The system also comprises a memory and map logic located at the destination processor that operate to receive the packet segments, map the segment identifier associated with each of the packet segments to a memory region in the memory, and store each received packet at its respective memory region. The system also comprises a Dequeue processor coupled to the memory and operable to determine when enough packet segments are stored in the memory to form a complete data frame. When enough packets are received, the Dequeue processor operates to output the packet segments that form the complete data frame.

In another embodiment included in the present invention, a method is provided for reordering packet segments in a packet switch network, wherein a plurality of source processors transmit the packet segments to a destination processor via one or more network fabrics. The method comprises steps of: including a segment identifier with each of the packet segments before they are transmitted from the source processors; defining one or more memory regions in a memory located at the destination processor; mapping the segment identifier associated with each received packet segment to a selected memory region, wherein the received packet segment is stored at the selected memory region; updating a memory map; identifying when enough packet segments have been received to form a complete data frame; and outputting the complete data frame.

BRIEF DESCRIPTION OF DRAWINGS

The foregoing aspects and the attendant advantages of this invention will become more readily apparent by reference to the following detailed description when taken in conjunction with the accompanying drawings wherein.

DETAILED DESCRIPTION OF PREFERRED EMBODIMENT

The present invention includes a system for reordering sequence based packet segments in a switching network. For example, in one embodiment of the invention, a reordering system is provided that receives packet segments from multiple sources and reorders the received packet segments based on the transmitting source, a sequence number, and a priority level associated with each segment. Thus, various embodiments of the system included in the present invention are discussed in detail in the following text.

Exemplary Embodiment

Figure 2:
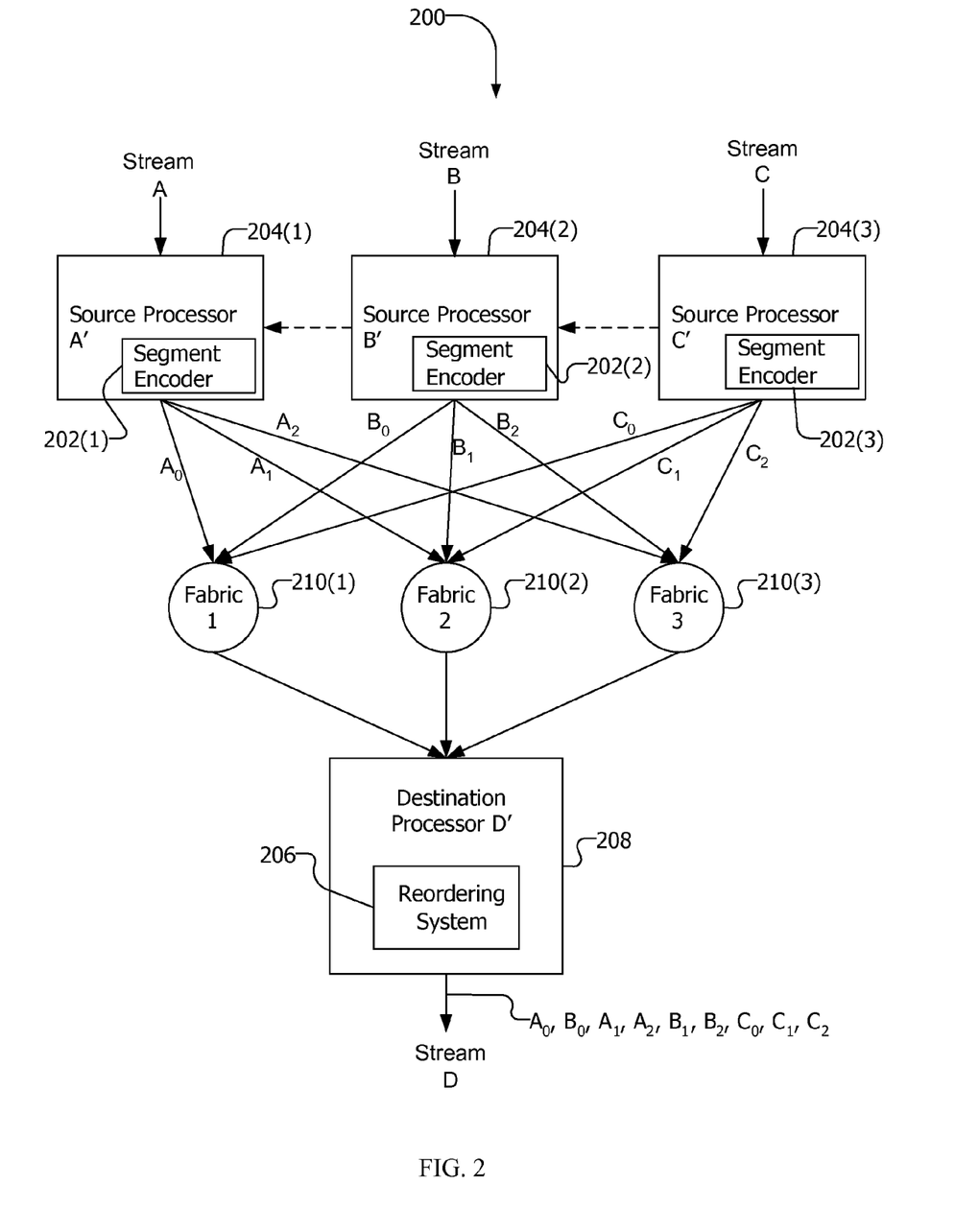
FIG. 2 shows a diagram showing one embodiment of a system for reordering segments constructed in accordance with the present invention.

FIG. 2 shows a diagram of one embodiment of a reordering system 200 constructed in accordance with the present invention for reordering packet segments in a switching network. The system 200 includes source processors 204 that each include a segment encoder 202 that operates to segment data frames included in the streams received by each source processor, and encode each segment in accordance with the present invention.

During operation of the system 200, the source processors 204 receive data streams containing data frames. The segment encoders 202 operate to segment each of the data frames into packet segments and encode a unique sequence identifier for each segment prior to transmitting them to one or more fabrics 206. In one embodiment of the invention, the segment encoders 202 also assign a priority to each segment in addition to the sequence identifier. Thus, each segment that is transmitted to the fabrics 210 includes a sequence identifier, and optionally, priority information. Furthermore, an identifier that identifies the transmitting source processor is included with each segment. The addition of the source identifier to the segments may be part of the operation of the source processors 204, or may be part of the operation of the segment encoders 202.

Any technique can be used to include sequence identifiers and/or priority levels with the packet segments. For example, the segment encoders can encode sequential sequence numbers into header information included with each segment. The priority indicator can be selected from one of several priority levels and also encoded into segment header information. Thus, any suitable technique can be used within the scope of the invention to associate a sequence identifier and priority information with each data segment.

The system 200 also includes a segment reordering system 206 at a destination processor 208. The reordering system 206 operates to receive the packet segments from the fabrics 210 and process the segments based on their respective sequence identifiers and priorities to reorder the segments, and thereby the frames, into the same order as when transmitted by the source processors. Thus, frames are reordered so that with respect to each source processor, the frames are placed in an identical order as when transmitted.

In FIG. 2, frames A, B, and C are transmitted from the source processors to the destination processor via the network fabrics. Each frame includes one or more segments that have been encoded with sequence numbers by the segment encoders associated with the source processors. Although FIG. 2 shows that each frame is transmitted to the destination via a selected network fabric, it is also possible that the segments within a frame are transmitted to the destination using multiple fabrics. Thus, the frames and corresponding segments may be transmitted to the destination using one or multiple fabrics, and the segment reordering system located at the destination will reorder the segments and frames to have the same order as when transmitted by their respective source processors. Therefore, the stream D includes all the frames in correct order, as shown at 212, and each frame includes segments that also have the correct order.

The destination processor may operate on the reordered data frames and segments in other ways to facilitate their transmission, but these other processes are not essential to the operation of one or more embodiments of the invention, and so will not be described in detailed. For example, the destination processor may serialize the frames for transmission, or provide known error detection and correction processes that are independent from the reordering system.

Figure 3:
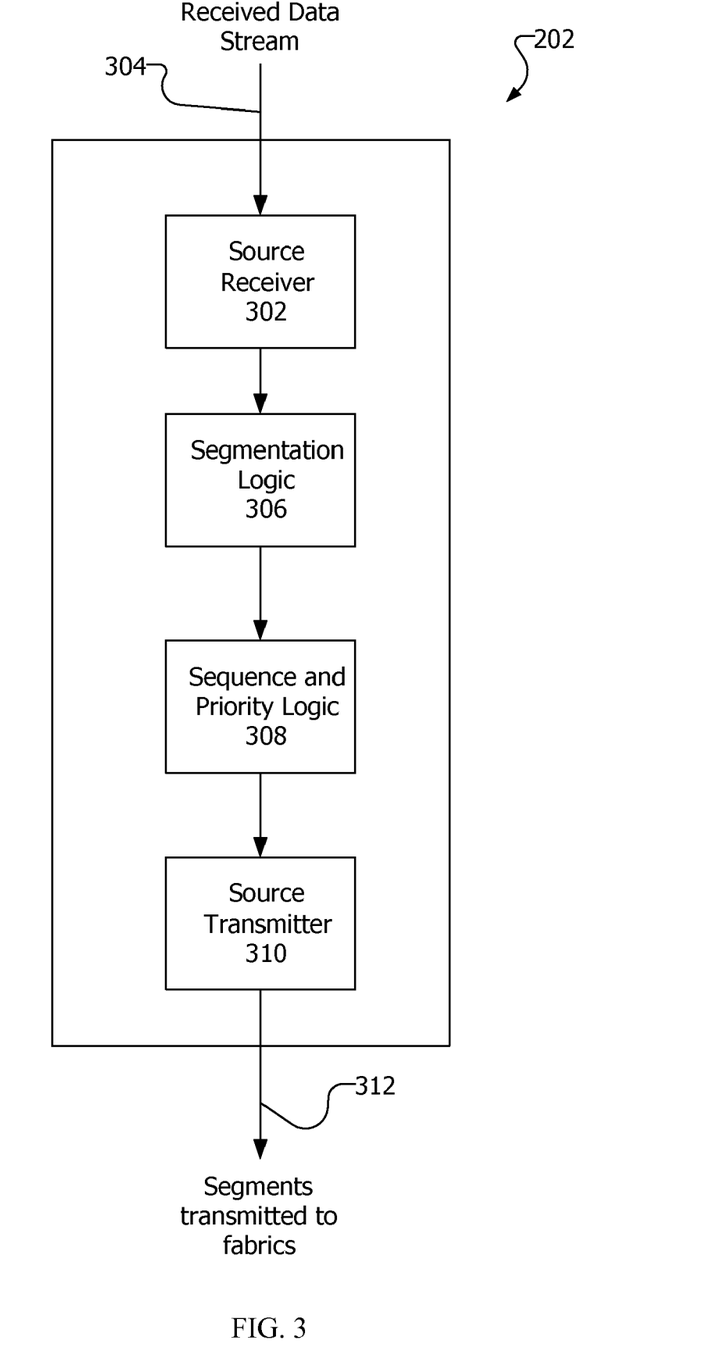
FIG. 3 shows a diagram of one embodiment of a segment encoder for use in a source processor.

FIG. 3 shows a diagram of one embodiment of a segment encoder 202 constructed in accordance with the present invention, for use in a source processor 204. A source receiver 302 receives a data stream 304 that contains frames of data. The source receiver transfers the received stream to segmentation logic 306. The segmentation logic 306 segments the frames of data into frame or packet segments. For example, the data frames included in the stream are segmented into 64-byte segments.

The segmented frames are transferred to sequence and priority logic 308. The logic 308 operates to associate a sequence identifier with each of the segments it receives. For example, the sequence identifier may be a 10-bit sequence number and the segments are encoded with a consecutive sequence numbers. Furthermore, the logic 308 optionally operates to associate a priority indicator with each segment, where all segments within a frame are given the same priority level. For example, a 3-bit priority level indicator provides eight priority levels. However, any number of priority levels is suitable for use with the present invention.

Once the segments have been processed to include sequence identifiers, and optionally, a priority indicator, they are transferred to a source transmitter 310 where they are transmitted from the source processor to a destination processor via one or more network fabrics. As part of the transmission process, each segment will include a transmitting source identifier.

Figure 4:
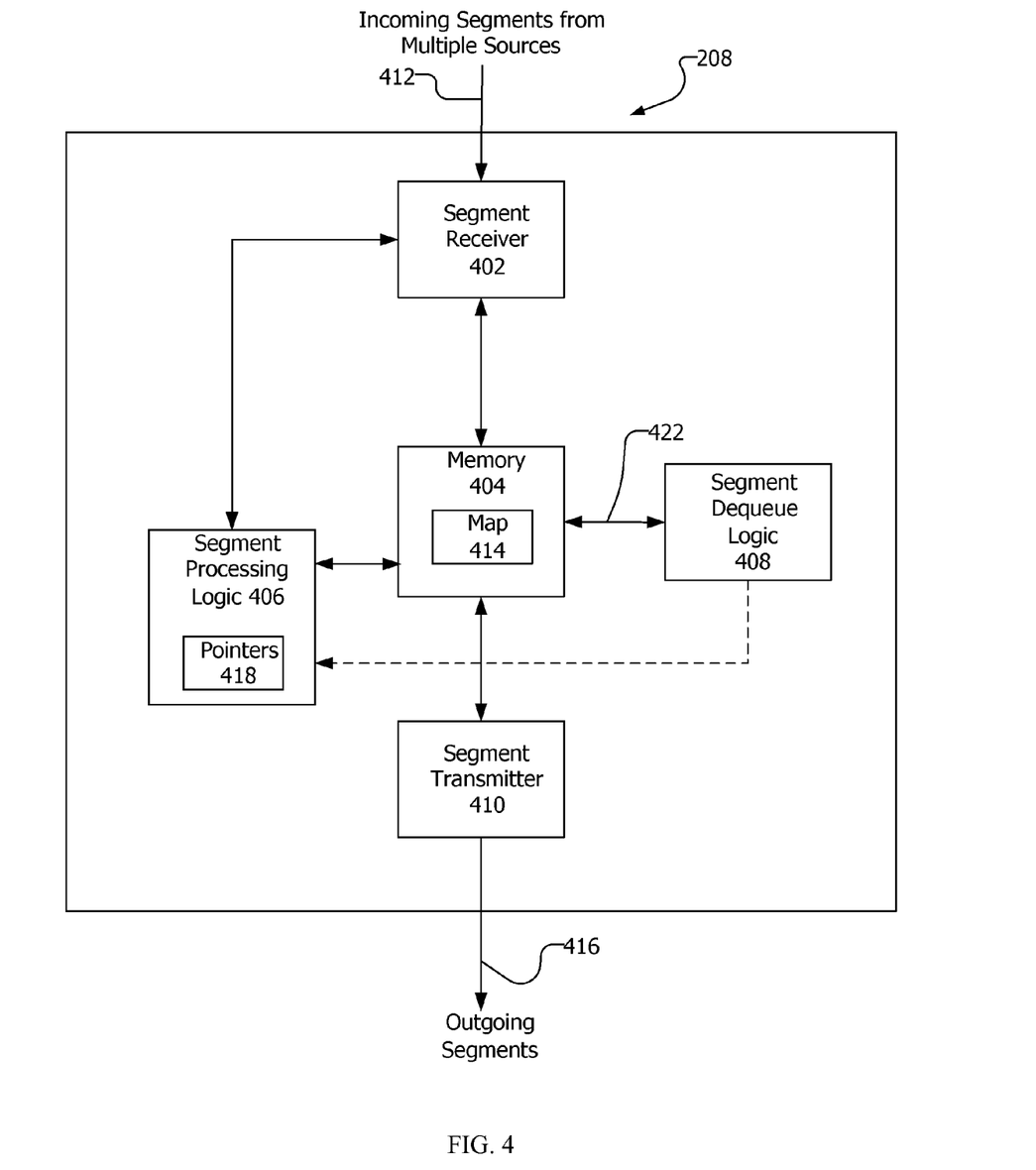
FIG. 4 shows a diagram of one embodiment of a reordering system constructed in accordance with the present invention.

FIG. 4 shows a diagram of one embodiment of a segment reordering system 206 constructed in accordance with the present invention for use in a destination processor, for example, the destination processor 208 in FIG. 2.

The basic function of the segment reordering system 206 is to keep track of the order of all of the segments as they are received at the destination processor. In one or more embodiments, a combination of the source identifier, unique sequence number, and priority assigned to each segment and inserted into the segment header prior to transmission from the source processors are used to track the segments. At the reordering system, the transmitting source identifier and the priority will be used to sort and store the segments into one of 320 reorder queues (assuming 64 source processors and 5 priority levels). The unique sequence number, associated with a particular queue, will be used to index a segment into its proper location in a memory. The segment reordering system also reassembles the segments into frames before sending them on to a transmitter for transmission to other network entities.

A segment receiver 402 receives one or more data streams 412 that are transmitted to the destination processor via one or more network fabrics. For example, the receiver 402 receives the streams 412 via the fabrics 210. The receiver 402 is coupled to a memory 404 and segment processing logic 406. The segment processing logic 406 operates to process the source identifier, the sequence identifier, and the priority level associated with each segment to determine a free memory location in the memory 404 where each segment will be stored. The processing logic 406 also operates to update a memory map 414 that indicates used and unused portions of the memory 404. Another function of the processing logic is to update and maintain a set of pointers 418 that are used to indicate the segments that have been received. If there are enough received segments to form a complete frame, the complete frame is transmitted to another destination. The processing logic 406 may comprise any suitable hardware such as a CPU, gate array or other hardware logic, and may also include any suitable software to operate in conjunction with the hardware.

The memory 404 may comprise any suitable memory type or technology, such as RAM, DRAM or FLASH memory. Included in the memory 404 is the memory map 414 that is used to indicate used and unused portions of the memory. The memory map 414 allows the memory 404 to be efficiently utilized, and thus minimize the required total memory. The memory is designed to allow high-speed operation of the network fabrics. In one embodiment, the memory has a size of four megabytes (4M), however, larger or smaller memories may be used in accordance with the present invention. A more detailed discussion of the memory 404 and the memory map 414 is provided in another section of this document.

Segment Dequeue logic 408 is coupled to the memory 404 via control channel 422 and operates to control the output of reordered segments into reassembled frames. For example, in one embodiment, the Dequeue logic 408 operates to control the transfer of segments from the memory to the segment transmitter 410 based on block values it receives from the memory map 414 and the pointers 418. A communication channel 420 couples the Dequeue logic 408 with the segment processing logic 406 so that the Dequeue logic can access the pointers 418. The pointers 418 (FIG. 4) are used to provide an indication of the segments that have been received and stored in the memory 404. The pointers are also used to remove the segments from the memory to perform the reordering process and reassembly of frames. The pointers are updated as each received segment is stored in the memory 404. The Dequeue logic may comprise any suitable hardware such as a CPU, gate array or other hardware logic, and may also include any suitable software to operate in conjunction with the hardware.

A segment transmitter 410 receives segments transferred from the memory 404 by the Dequeue logic 408 and transmits these segments, and the reassembled frames they comprise, in the correct order to other entities in the network via a transmitter output 416. Thus, the reordering system 206 operates to perform reordering of segments and the reassembly of frames in accordance with the present invention.

Figure 5:
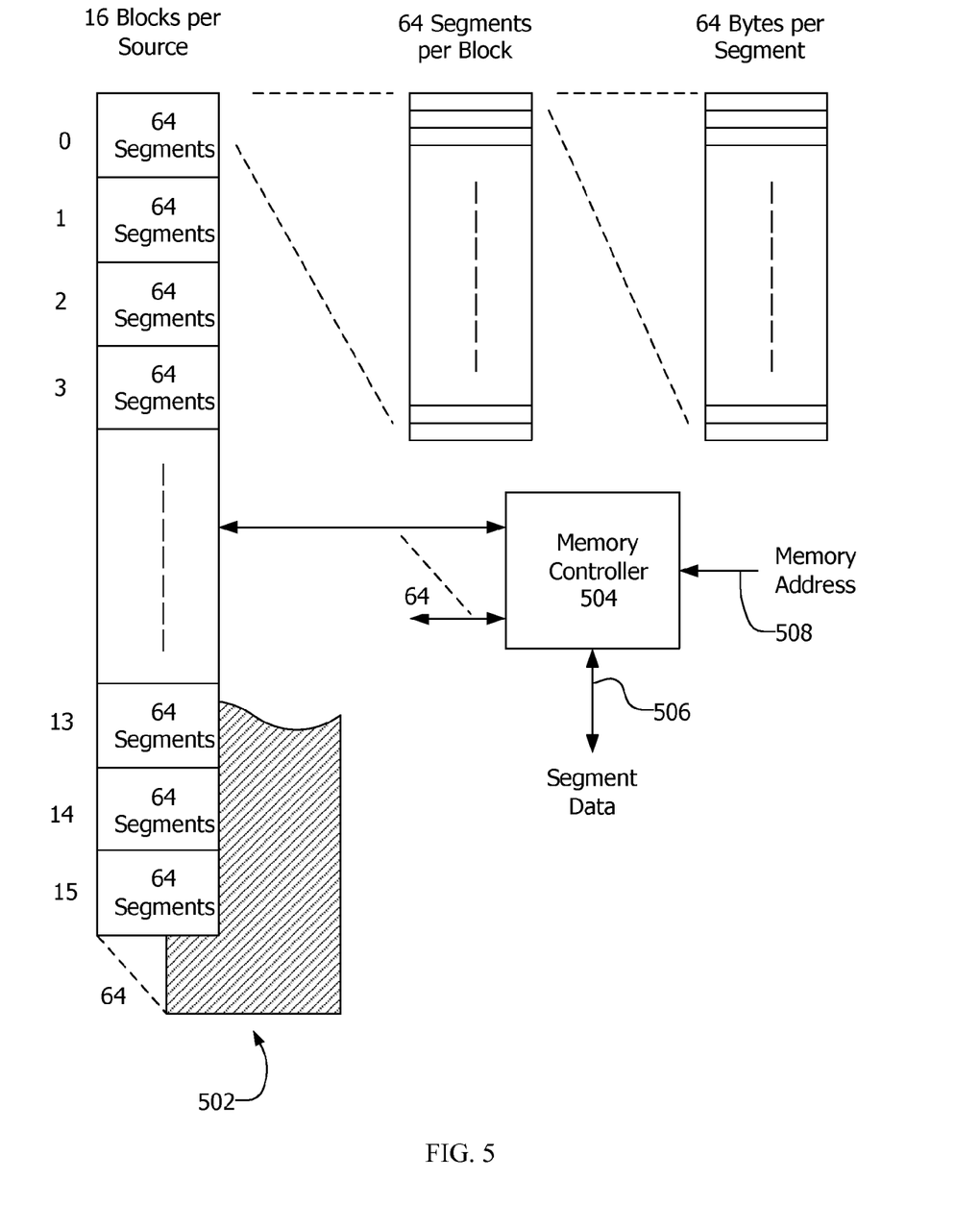
FIG. 5 shows one embodiment of a memory for use in the reordering system of FIG. 4.

FIG. 5 shows one embodiment of a memory structure 500 included in the memory 404 for use in a reordering system in accordance with the present invention. The memory structure 500 represents one memory structure, however, other memory structures are suitable for use in accordance with the present invention. Thus, FIG. 5 is exemplary and not intended to limit the scope of the invention to a particular memory structure.

The memory structure 500 includes a segment memory 502 coupled to a memory controller 504. The segment memory comprises a 64K portion of memory for each transmitting source. The 64K portion of memory is grouped into 16 blocks (0-15) with each block having the capacity to store 64 segments each having 64-bytes.

The memory controller 504 is coupled to all the 64K portions of memory so that segment data 506 may be stored and retrieved from any memory location based on a received memory address 508. The memory controller comprises any suitable hardware logic and/or associated software to access the memory 502.

In one embodiment, each memory portion comprises a total of 65536 (64K) bytes of storage that is dedicated to each transmitting source processor. If there are sixty-four source processors transmitting segment data, the memory 404 is sized to have a capacity of 4,194,304 bytes (4 Mbytes).

Figure 6:
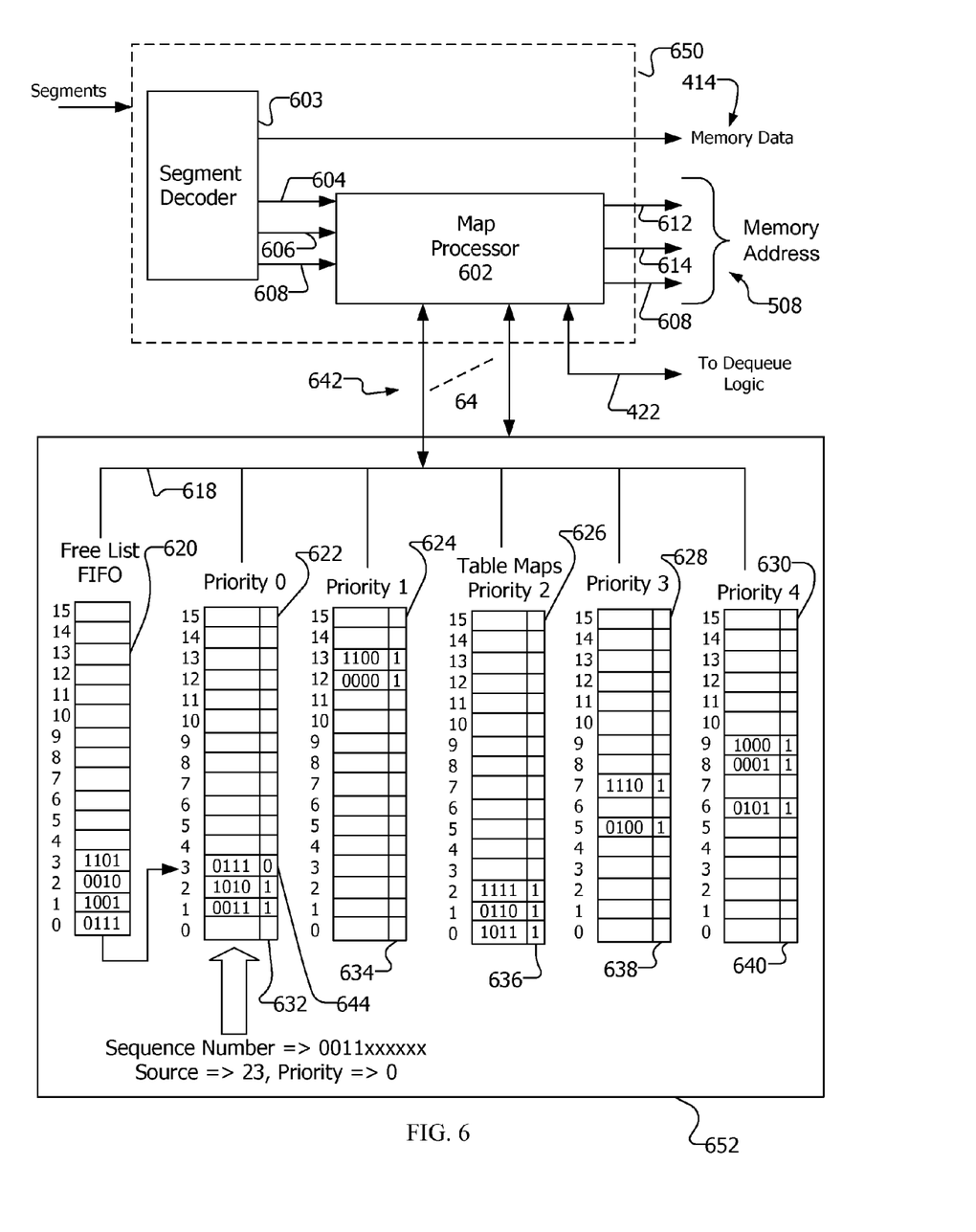
FIG. 6 shows a diagram of one embodiment of a mapping system for use in the reordering system of FIG. 4.

FIG. 6 shows a diagram of one embodiment of the memory map 414 that includes segment processing logic 650 and map tables 652 constructed in accordance with the present invention for use in the reordering system of FIG. 4. The segment processing logic 650 includes a segment decoder 603 that receives segment data from the segment receiver 402 and operates to decode sequence 604, priority 606, and transmitting source 608 information for each received segment. The sequence identifier 604, priority 606, and source identifier 608 are input to a map processor 602 that operates to output a memory address 508 that is formed from a portion of the sequence identifier 612, a memory block address 614 that is obtained from the map tables 652, and the source identifier 608. The map processor 602 also includes an interface 642 to the map tables 652. The map processor 602 may comprise any suitable hardware such as a CPU, gate array or other hardware logic, and may also include any suitable software that operates in conjunction with the hardware.

The map processor 602 is coupled to the memory tables 652 via a bus 618. The memory tables include a free list FIFO 620, a priority 0 table list 622, a priority 1 table list 624, a priority 2 table list 626, a priority 3 table list 628, and a priority 4 table list 630.

Associated with each priority table list is a valid list that contains valid bits. For example, the table list 622 is associated with valid list 632, the table list 624 is associated with valid list 634, the table list 626 is associated with valid list 636, the table list 628 is associated with valid list 638, and the table list 630 is associated with the valid list 640.

The group of memory lists are used to store the indirect location of the selected memory block 502 where the segment data is written. A set of these same lists exists for each source processor that is transmitting segment data to the destination. Therefore, if there are sixty-four source processors transmitting segment data, there will be sixty-four groups of memory lists. For example, as shown at 642, there are sixty-four bus connections that connect the map processor 602 to sixty-four groups of lists that are used to store segment data from sixty-four transmitting source processors. Although the memory lists shown are based on five priority levels, more or less priority levels may be used and result in a corresponding number of memory lists.

The map processor 602 operates to map segment data into the memory 404 for storage. The map processor uses the source identifier 608 to select which group of lists to use to map the segment data. For example, if the source identifier is twenty-three, the group of lists used may be the group of lists shown in FIG. 6. The map processor 602 uses the priority information included with each segment to selected one of the priority table lists. For example, if the priority associated with a segment is priority 1, then the map processor uses priority table list 1, shown at 624, to map the segment data.

The map processor 602 uses the sequence identifier included with each segment to indirectly map a block in the selected priority table list to a block in the memory 404 where the segment will be stored. For example, the map processor uses the upper four bits of the sequence identifier to select one of sixteen entries in the selected priority table list. The contents of the entry in the selected priority table list will be used as the block address 614.

However, if the entry in the selected priority list contains an invalid block address, then the map processor operates to obtain an available block memory address from the free block list 620. The map processor enters this newly obtained block address into the entry in the selected priority table list, and validates the valid bit. Thereafter, sequence numbers whose upper bits point to this entry in the selected priority table list will obtain this block address to be used to store the segment data. The valid lists contain bits that indicate whether an address in the corresponding priority table lists is valid. These bits are validated or invalidated depending if the specific block of memory is being used or if all of the segments in that block have been sent.

An example of the mapping process will now be described. Assume the memory 404 is configured to have a total of four Megabytes of storage. This allocation will support segments transmitted from sixty-four source processors; each allocated 64 k bytes to store all of their incoming segments. These 64 k bytes will be further subdivided into 16 blocks representing a total of 1024 segment storage locations. Each segment storage location contains a block of 64 bytes of data. The incoming segment will be stripped of its segment header and CRC, and the remaining 64-byte segment payload will fit within the 64-byte block.

The 16 blocks (or groups) representing a total of 1024 segment storage locations can be dynamically allocated to any of the segment priorities as needed. The four MSB's of the sequence number included with each segment indirectly maps into one of these 16 blocks of memory. The mapping is stored in the priority lists and any unused groups are stored in the free list FIFO 620.

The free list FIFO 620 hold 16 group addresses. Each group address is 4-bits wide and directly maps to a memory address as the block address 614. There are a total of 64 free list FIFOs, one for each transmitting source.

There are 5 priority table lists and each can store up to 16 block addresses. The valid bit associated with each entry will determine if a valid block address is stored in that entry. After initialization or reset, the free list FIFO 620 will contain all 16 block addresses and all of the valid bits associated with the priority table lists will be cleared to indicate that no entries in the lists are valid.

When a segment arrives, the four most significant bits (MSB) of the sequence number 604 are used to find the block address 614 that the segment should be written to in the memory 404. The source 608 and priority 606 of the segment will determine which priority table list to use, and the four MSB's of the sequence number 604 will be used to address into that table to find a selected entry.

First, the valid bit for the selected entry will be checked to determine if a group has already been assigned to the sequence number. If a group has been assigned, the valid bit will be a one, and the contents of that entry will be used as the block address 614 for addressing the memory 404. If the valid bit is not set, then a new group will be obtained from the free list FIFO 620, inserted into the table list at the selected entry, and the corresponding valid bit will be set to a one. Thus, segments that follow having the same source, priority, and four MSB sequence number will use this new group address.

In this example, it will be assumed that a segment is received from a source processor having a source identifier 608 of twenty-three with a priority of zero, and the four MSB's of the sequence number are 0011. A check in the priority 0 table list 622 at entry three shows that the valid bit is zero, as indicated at 644. A new address group is needed and the map processor operates to obtain it from the free list FIFO 620. The new address group has the value 0111 and is inserted into the table list 622 at entry three and will also be used as block address 614 to access the memory 404. The valid bit at entry three will then be set to a one to indicate that the address is valid (not shown in the FIG. 6).

The lower 6 bits of the sequence number 604 are directly mapped into one of the 64 memory blocks as the sequence address 612. If another segment comes in from transmitting source twenty-three with a sequence number of (0100xxxxxx binary) and a priority of two, the map processor 602 will map a value of 1111 to the block address 614. This value is determined from the priority 2 table list as shown at 626. Also shown is the control channel 422 that allows information from the map processor to flow to the Dequeue logic during the dequeue process.

Figure 7:
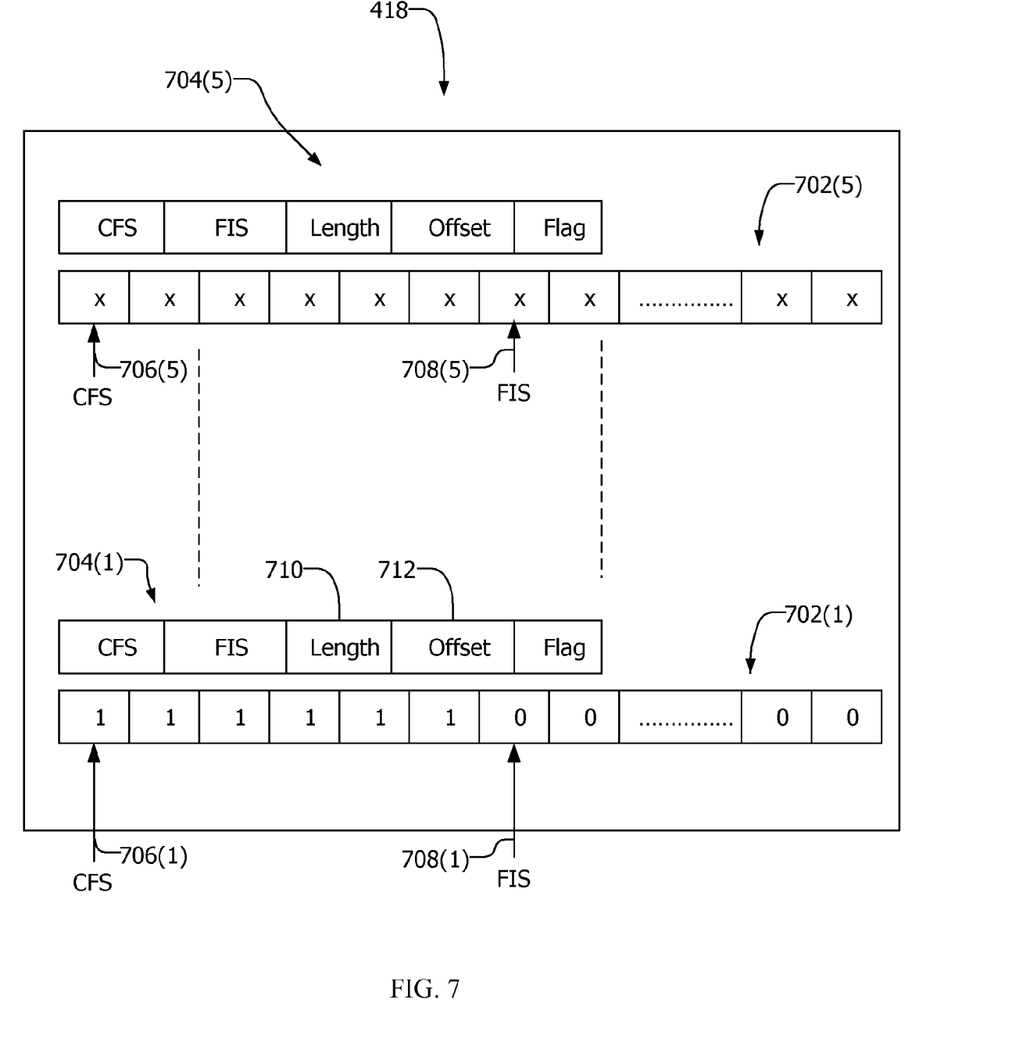
FIG. 7 shows one embodiment of a memory map for use in the reordering system of FIG. 4.

FIG. 7 shows one embodiment of the pointers 418 for use in a reordering system in accordance with the present invention. The pointers 418 include a map list 702 and a map pointer 704 for each priority level transmitted by each source processor. Therefore, since there are five priority levels in the present example, there are five map lists 702(1-5) and five map pointers 704(1-5) per transmitting source processor. In a system where there are sixty-four transmitting source processors and five priority levels, the total number of map list 702 and associated map pointer 704 sets will be 320.

The map list 702 includes a current frame segment (CFS) pointer 706 and a first invalid segment (FIS) pointer 708. The CFS pointer is the location of a segment that contains the start (head) of a frame currently being stored in the memory 404. The FIS pointer 708 is the first location, relative to the CFS, indicating where a segment has not yet arrived. In other words, it is the next missing segment in a series of segments starting from the CFS pointer. Values for both the CFS and FIS pointers are entered into the map pointer 704.

The map pointer 704 also includes a length value 710 and an offset value 712. The length value is the total length of the single frame (in bytes), whose head is located at the CFS pointer. The length value can be found at the head of a segment or it may be embedded within a segment if the frame ends within the segment and the next frame is packed at the tail of the ending frame. The offset value, measured in bytes, determines where the frame head starts within a segment. Again, the offset value can be found at the head of a segment, for example, by receiving a segment with an offset of zero or extracted from a segment while de-queuing.

The map list 702 keeps track of all the segments that have arrived and are ready to be reordered. For one source/priority, the corresponding map list contains 1024 bits of data. These bits directly map to the 1024 segment storage locations in the memory 404. The sequence number is used to directly map the bits in the map list to the segments that are stored in memory. As a result, a bit in the map list will be set valid when a segment arrives, and cleared when the segment is de-queued.

Figure 8:
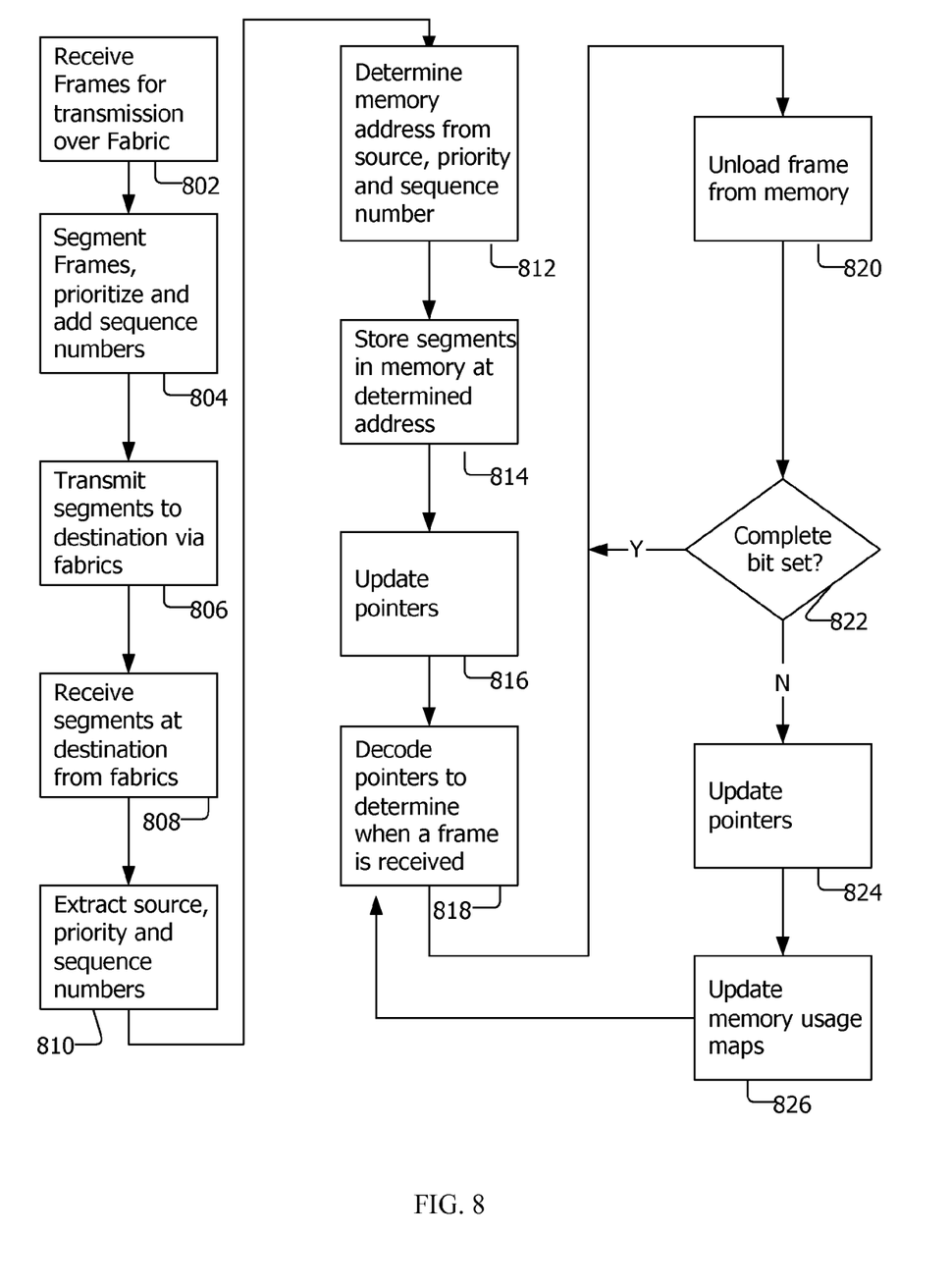
FIG. 8 shows a flow diagram for reordering segments in accordance with the present invention.

FIG. 8 shows a flow diagram 800 for reordering segments in accordance with the present invention. At block 802, data frames are received at one or more source processors for transmission to a destination processor via one or more network fabrics.

At block 804, the frames are segmented and are encoded with a sequence identifier, a priority value and a source identifier. In one embodiment, the segment data payload is 64-bytes long. At block 806, the segments are transmitted to a destination processor via one or more network fabrics.

At block 808, the transmitted segments are received at a destination processor. The destination processor receives segments from one or more transmitting source processors via the network fabrics.

At block 810, the source identifier, priority level, and sequence identifier are extracted from each received segment. For example, the segment decoder 603 extracts this information from each received segment. At block 812, the extracted information is used to determine a memory address in a memory where each segment is stored. For example, as shown in FIG. 6, the map processor 602 operates to use the extracted information received from the decoder 603 to index into the map 414 to determine at least a portion of the memory address where a received segment will be stored.

At block 814, each received segment is stored into memory at the address determined from the previous step. At block 816, the pointers 418 are updated to reflect how many segments have been received.

The above steps describe the flow of segment data from transmitting source processors to a destination processor via one or more network fabrics. Once the segments are received at the destination processor, they are stored into a memory in accordance with the above steps. The following steps are used to unload the segments from the memory for transmission to another network entity. In the process of unloading the segments, the segments and corresponding data frames are reordered in accordance with the invention. It should be noted that the reception, reordering, and transmission of frames as described by the reordering process of FIG. 8 is a continuous process. Therefore, frames may continue to be received during the reorder and transmission processes.

At block 818, a frame check is performed to determine if enough segments have been received and stored into the memory to form a complete frame. For example, as segments are received and stored in the memory, and map lists are used to keep track of the sequential number of segments that have been received. For example, if the memory map as provided in FIG. 7 is used, the CFS pointer, the FIS pointer, the table entries, the length, and the offset values are used to calculate if a frame is contained within the two pointers. If it is determined that a complete frame has been received and is stored in the memory, a ready flag that is associated with the context that was just checked is activated to indicate that a frame can be dequeued.

At block 820, assuming a complete frame has been received the completed frame is unloaded from the memory. The logic reads the CFS and FIS pointers and length from the associated context that was selected and dequeues the associated frame.

At block 822, a test is performed after the current frame is unloaded to determine if there are enough segments in memory to unload another frame. For example, there may be another frame beginning with the next segment directly after the current frame that was unloaded. In another situation, there may be another frame that is partially packed within the last segment of the current frame. For example, the header for the next frame is packed into the last segment of the current frame. If there are no other complete frames to unload, the method proceeds to block 824. If there is another frame to unload, the method proceeds back to block 820.

When the frames are being unloaded, the CFS pointer will be updated to the point where the last frame ended to become the new CFS pointer. If another frame is found, the length of that next frame, the FIS pointer, and the new CFS pointer are used to determine if next frame can be dequeued. This process will continue until there are no more frames that can be dequeued.

At block 824, when there are no more frames to be dequeued, the Dequeue logic writes back the new CFS pointer, length and offset to the Context Memory. The new CFS pointer will be pointing to indicate the location of the start of the next frame in memory.

At block 826 the memory usage maps are updated. For example, the last function that is performed is that all of the valid bits from the old CFS pointer to the new CFS pointer are cleared, and if any memory blocks need to be de-allocated, they are put back onto the free list FIFO 620 so that they may be reused to store additional received segments. The method then continues at block 818.

In accordance with the present invention, segments transmitted from a particular source are reordered to have the same order as when initially transmitted. Therefore, one or more embodiments included in the present invention provide a system for reordering segments in a switching network. After the context is dequeued, and there are no more frames that can be dequeued from that context, the Dequeue logic clears the selected ready flag. The segments associated with the frame are read out of the memory. The frames are then passed to the segment transmitter 410 and the frames/segments are sent on to the next destination in the system.

Thus, the present invention includes a system for reordering packet segments in a packet switch network. The embodiments described above are illustrative of the present invention and are not intended to limit the scope of the invention to the particular embodiments described. Accordingly, while several embodiments of the invention has been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

It is claimed:

1. A data switch comprising:
a plurality of first processors, each first processor performing actions including
receiving data frames transmitted to the data switch
segmenting received data frames into segment payloads
creating a segment from each segment payload by adding a segment header including a source identifier and a sequential sequence number, wherein the source identifier identifies the first processor and the sequence number identifies the segment payload's original location within the respective data frame
a plurality of switch fabrics interconnecting the plurality of first processors to a second processor, the second processor comprising:
a memory having blocks sized for storing data frames
a reordering system that performs actions including
extracting the segment header from each received segment
using a portion of the sequence number as an index to obtain a memory block address for storing the segment payload into a block of the memory
stripping the segment header from the segment and storing the segment payload in the memory using the memory block address determining when enough segment payloads are stored in the memory to form a complete data frame ready for transmission reassembling the stored segment payloads into the complete data frame and transmitting the complete data frame out of the data switch.

2. The data switch of claim 1, wherein segment payloads of segments having the same source identifier and the same index are orderly stored in the same memory block to recreate the original data frame.

3. The data switch of claim 2, wherein the second processor further comprises a plurality of map tables corresponding to the plurality of first processors, wherein each map table includes a first column for storing memory block addresses the source identifier is used to select one of the plurality of map tables, and the index points to an indexed entry in the selected map table containing the memory block address for storing the segment payload.

4. The data switch of claim 3, wherein the second processor further comprises a free list FIFO associated with each first processor, the free list FIFOs each comprising a FIFO for storing free memory block addresses the map tables include valid indicators associated with each table entry for identifying whether a memory block has been assigned to a given index the actions performed by the reordering system further include checking to determine if a memory block has been assigned to the index by checking a valid indicator associated with the indexed entry, and if the valid indicator associated with the indexed entry is set, the contents of the indexed entry will be used as the memory block address for storing the segment payload when the valid indicator associated with the indexed entry is not set, obtaining a free block address from the free list FIFO, storing the free block address into the indexed entry, and setting the valid indicator associated with the indexed entry.

5. The data switch of claim 4, wherein the actions performed by the reordering system further include clearing the valid indicator corresponding to the complete data frame when the complete data frame is transmitted.

6. The data switch of claim 3, wherein a plurality of priority levels are associated with each first processor the segment header includes a priority level indicator chosen from selected priority levels there is a separate column in each map table for each priority level associated with the corresponding first processor.

7. A process for switching data frames in a data switch, the data switch comprising a plurality of first processors, a second processor, a plurality of switch fabrics connecting the first processors to the second processor, and a memory having blocks sized for storing the data frames, the process comprising:

one or more of the first processors receiving data frames transmitted to the data switch segmenting the received data frames into segment payloads creating a segment from each segment payload by adding a segment header including a source identifier and a sequential sequence number, wherein the source identifier identifies the associated first processor and the sequence number identifies the segment payload's original location within the respective data frame the switch fabrics switching segments from the first processors to the second processor the second processor re-assembling received segments into data frames by extracting the segment header from each received segment using a portion of the sequence number as an index to obtain a memory block address for storing the segment payload into a block of the memory stripping the segment header from the segment and storing the segment payload in the memory block using the memory block address determining when enough segment payloads are stored in the memory to form a complete data frame ready for transmission reassembling the stored segment payloads into the complete data frame and transmitting the complete data frame out of the data switch.

8. The process of claim 7 further comprising orderly storing segment payloads of segments having the same source identifier and the same index in the same memory block to recreate the original data frame.

9. The process of claim 8, wherein using a portion of the segment header as an index further comprises using the source identifier to select one of a plurality of map tables, wherein separate map tables are associated with each first processor using a portion of the sequence number as the index that points to an indexed entry in the selected map table, the indexed entry containing the memory block address for storing the segment payload.

10. The process of claim 9 further comprising storing free memory block addresses in a free list FIFO associated with each first processor identifying whether a memory block has been assigned to a given index through reference to valid indicators associated with each entry in the selected map table, wherein if the valid indicator associated with the indexed entry is set, using the contents of the indexed entry as the memory block address for storing the segment payload if the valid indicator associated with the indexed entry is not set, then obtaining a free block address from the free list FIFO, storing the free block address into the indexed entry of the selected map table, and setting the valid indicator wherein the valid indicator corresponding to the complete data frame is cleared when the complete data frame is transmitted by the second processor.

11. The process of claim 9, wherein a plurality of priority levels are associated with each first processor each segment header includes a priority level indicator each of the plurality of map table includes a column for each priority level associated with the corresponding first processor using a portion of the segment header as an index further comprising using the priority level indicator to select the corresponding column in the selected map table.

12. A destination processor for transmitting data frames out of a data switch comprising a memory having blocks sized for storing data frames a reordering system for re-assembling segments switched to the second processor into data frames, the reordering system performing actions including extracting a segment header including source identifier and a sequential sequence number from each received segment, wherein the source identifier identifies a source processor and the sequence number identifies an original location of a segment payload within the respective data frame using a portion of the sequence number as an index to obtain a memory block address for storing a segment payload into a block of a memory stripping the segment header from the received segment and storing the segment payload in the memory using the memory block address determining when enough segment payloads are stored in the memory to form a complete data frame ready for transmission reassembling the stored segment payloads into the complete data frame and transmitting the complete data frame out of the data switch.

13. The destination processor of claim 12, wherein segment payloads of segments having the same source identifier and the same index are orderly stored in the same memory block to recreate the original data frame.

14. The destination processor of claim 13 further comprising a plurality of map tables corresponding a plurality of source processors, wherein each map table includes a first column for storing memory block addresses the source identifier is used to select one of the plurality of map tables the index points to an indexed entry in the selected map table containing the memory block address for storing the segment payload.

15. The destination processor of claim 13 wherein the second processor further comprises a free list FIFO associated with each first processor, the free list FIFOs each comprising a FIFO for storing free memory block addresses the map tables include valid indicators associated with each table entry for identifying whether a memory block has been assigned to a given index the actions performed by the reordering system further include checking to determine if a memory block has been assigned to the index by checking the valid indicator associated with the indexed entry if the valid indicator associated with the indexed entry is set, the contents of the indexed entry will be used as the memory block address for storing the segment payload if the valid indicator associated with the indexed entry is not set, then obtaining a free block address from the free list FIFO, storing the free block address into the indexed entry, and setting the valid indicator associated with the indexed entry.

16. The destination processor of claim 15, wherein the actions performed by the reordering system further include clearing the valid indicator corresponding to the complete data frame when the complete data frame is transmitted.

17. The destination processor of claim 14, wherein a plurality of priority levels are associated with each first processor the segment header includes a priority level indicator chosen from selected priority levels there is a separate column in each map table for each priority level associated with the corresponding first processor.

* * * * *